US010070174B2

(12) United States Patent
Flick et al.

(10) Patent No.: US 10,070,174 B2
(45) Date of Patent: Sep. 4, 2018

(54) MOVIE PACKAGE FILE FORMAT TO PERSIST HLS ONTO DISK

(71) Applicant: Apple Inc., Cupertino, CA (US)

(72) Inventors: Christopher L. Flick, San Jose, CA (US); Courtney A. Kennedy, Sunnyvale, CA (US); David L. Biderman, San Jose, CA (US); John Y. Su, Sunnyvale, CA (US); Jordan B. Schneider, San Francisco, CA (US); Michel A. Rynderman, San Jose, CA (US); Roger N. Pantos, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 115 days.

(21) Appl. No.: 14/732,575

(22) Filed: Jun. 5, 2015

(65) Prior Publication Data
US 2016/0360265 A1  Dec. 8, 2016

(51) Int. Cl.
H04N 21/4147 (2011.01)
H04N 21/432 (2011.01)
H04N 21/41 (2011.01)
H04N 21/2343 (2011.01)
H04N 21/458 (2011.01)
H04N 21/858 (2011.01)
H04N 21/8543 (2011.01)
H04N 21/435 (2011.01)
H04N 21/262 (2011.01)
(Continued)

(52) U.S. Cl.
CPC ... *H04N 21/4325* (2013.01); *H04N 21/23439* (2013.01); *H04N 21/26258* (2013.01); *H04N 21/4126* (2013.01); *H04N 21/4147* (2013.01); *H04N 21/435* (2013.01); *H04N 21/4334* (2013.01); *H04N 21/458* (2013.01); *H04N 21/8456* (2013.01); *H04N 21/8543* (2013.01); *H04N 21/8586* (2013.01)

(58) Field of Classification Search
CPC combination set(s) only.
See application file for complete search history.

(56) References Cited

U.S. PATENT DOCUMENTS 8,341,255 B2  12/2012 Gopalakrishnan
8,352,996 B2  1/2013 Khouzam et al.
(Continued)

FOREIGN PATENT DOCUMENTS

WO  2015/015140 A1  2/2015

*Primary Examiner* — Kieu Oanh T Bui
(74) *Attorney, Agent, or Firm* — Baker & Hostetler LLP; Robert L. Hails

(57) ABSTRACT

System and methods for storing streamed media data to memory for future playback are provided. A device may stream media data associated with a movie over a network connection. The data streamed to the device will be saved to device memory and will then be playable offline. A manifest associated with the media data will be downloaded to the device and modified to reflect the location of the locally stored media data. During subsequent playback of the media data, the manifest will indicate that at least a portion of the media data exists in local memory. Some portions of the media data not stored locally may be subsequently retrieved from a remote source. The stored data may be updated or added to as necessary.

27 Claims, 7 Drawing Sheets

(51) Int. Cl.
*H04N 21/433* (2011.01)
*H04N 21/845* (2011.01)

(56) References Cited

U.S. PATENT DOCUMENTS

| | | | |
|---|---|---|---|
| 8,813,117 B1* | 8/2014 | Inskip, VI | H04N 7/1675 |
| | | | 709/231 |
| 2010/0228862 A1 | 9/2010 | Myers | |
| 2010/0306373 A1 | 12/2010 | Wormley | |
| 2011/0246621 A1 | 10/2011 | May, Jr. et al. | |
| 2012/0192234 A1 | 7/2012 | Britt et al. | |
| 2012/0284804 A1 | 11/2012 | Lindquist et al. | |
| 2014/0059244 A1 | 2/2014 | Panje et al. | |
| 2014/0237521 A1* | 8/2014 | Rothschild | H04N 21/236 |
| | | | 725/88 |
| 2014/0304377 A1 | 10/2014 | Andersson et al. | |
| 2015/0095460 A1 | 4/2015 | Berger et al. | |
| 2015/0271541 A1* | 9/2015 | Gonder | H04N 21/278 |
| | | | 725/134 |

\* cited by examiner

200

300

400

500

600

700

MOVIE PACKAGE FILE FORMAT TO PERSIST HLS ONTO DISK

BACKGROUND

Video content is constantly being accessed by users of various handheld and computing devices whether that data is streamed, purchased, rented, or requested for download from a server, exchanged between users as in a video conference call, or published for sharing with friends and family. However, given the variety of devices that may access a given video, and the limitations of the multiple and various networks used for accessing and exchanging that video data, multiple versions of a single video are often created and stored. For example, through these multiple versions, different resolutions of the video content are provided via multiple created streams or tracks. This allows individuals accessing the video content on a smart phone to view the same video content as individuals accessing the video content on a desktop or television system, with the content tailored to the receiving device. Additional considerations such as audio, captions, subtitles in different languages and decoders that are not compatible with the different coding types may additionally each require a completely different version of the same video content.

Some video content is accessed only a single time, in which case the video may be streamed to a device, decoded, rendered on the display, and discarded. However, other video content may be downloaded and stored locally to be played at a future date. Additionally, source video content may be updated subsequent to the download. For example, a new commentary track, a new subtitle language, caption information, or an alternate quality stream may be made available after the original video was already downloaded.

While traditional HTTP Live Streaming (HLS) provides for streaming of movie data and buffering of received movie data to be played on a local device, HLS traditionally does not provide for storing received movie data as a dynamic movie package or for updating the stored movie package with additional or new versions of the movie data as necessary.

Accordingly, there is a need in the art for a flexible and adaptable movie package storage system that provides for efficient updates to the movie package as they become needed or available. Such a storage system provides for systems and methods that create and access video data in a more user-friendly and resource friendly manner.

BRIEF DESCRIPTION OF THE DRAWINGS

The foregoing and other aspects of various embodiments of the present disclosure will be apparent through examination of the following detailed description thereof, in conjunction with the accompanying drawing figures in which similar reference numbers are used to indicate functionally similar elements.

DETAILED DESCRIPTION

Figure 1:
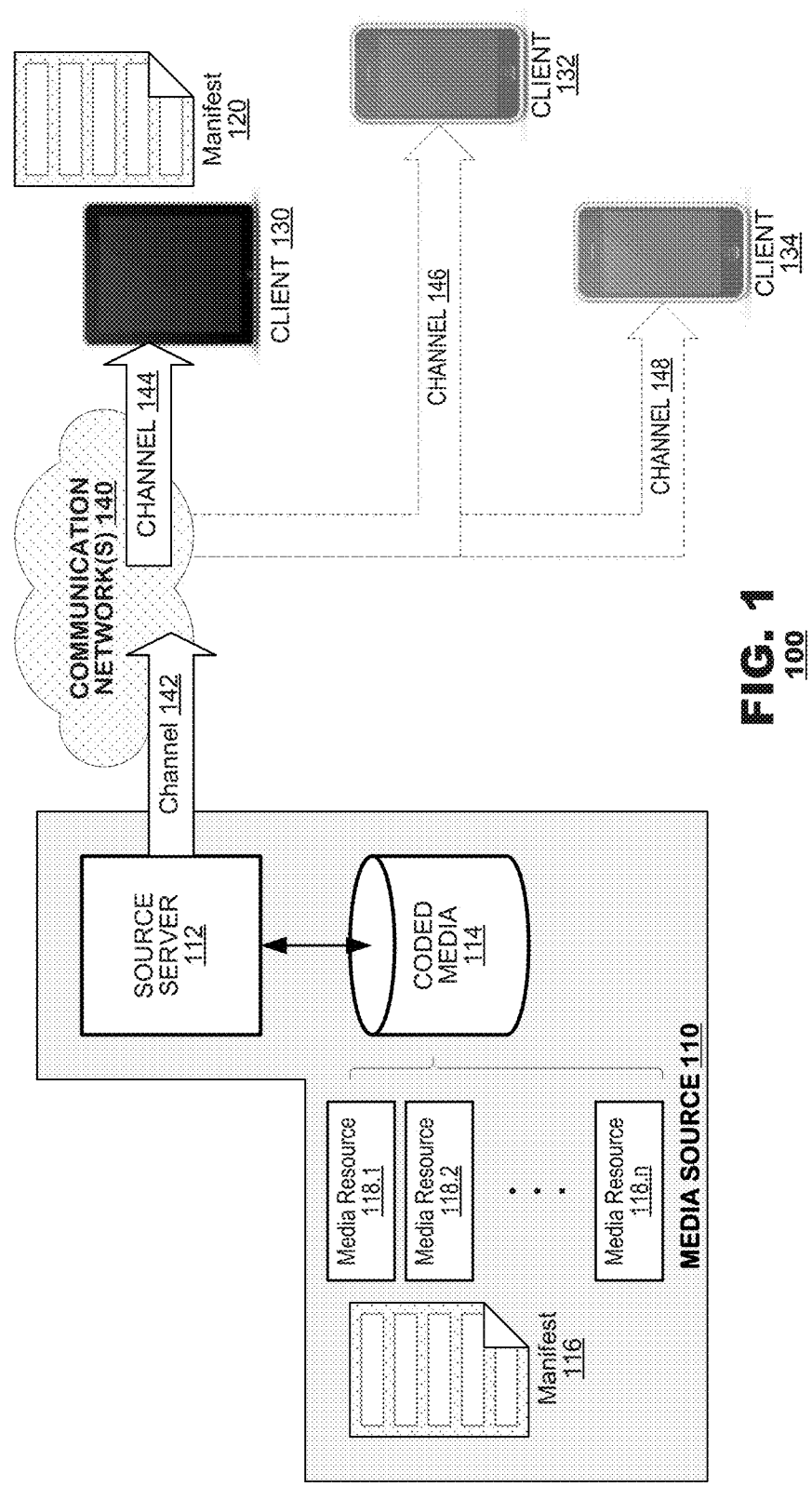
FIG. 1 is a simplified functional block diagram of an exemplary streaming system according to an embodiment of the present disclosure.

Movie packages provide a file format tool for use by standard media players that behave like standalone, self-contained media files. A movie package is a reliably playable movie distribution file format that allows for efficient, multi-tiered delivery and playback in both online and offline environments. Movie packages are described in detail in co-pending U.S. patent application Ser. No. 14/498,146, entitled "Movie Package File Format" filed Sep. 26, 2014, which is incorporated herein in its entirety by reference. The movie package format is compatible with HTTP Live Streaming (HLS), allowing the same produced video, audio and other media assets to be used in both a classic HLS deployment and in a movie package. Movie packages may contain tiers that provide for multiple sets of movie variations that are individually selectable for playback. A locally stored movie package may contain any subset of available tiers for a movie. Non-resident tiers can be discovered and downloaded into the movie package as needed or when available.

Upon request of a movie package, the requesting device may begin streaming the movie over the available network connection. In some situations the network will be a high-speed Internet or a Wi-Fi network. Playback of the movie may occur as soon as sufficient data has been downloaded/buffered. Although the user may be watching the movie as it is streamed to the requested device, there's typically a small buffer of media data retrieved in advance of the playback point. As the data is buffered, it may also be stored in local memory.

Different tracks of a movie need not be streamed at the same time. For example, alternate audio tracks may be streamed and added to the movie package as desired. Similarly alternate subtitle, caption, commentary, or quality tracks may be streamed as they become available or as the bandwidth for additional streaming becomes available.

According to an embodiment, the data streamed to the client device will be saved to the device memory concurrently with or after playback of the stream on the device. If the streaming of the media data is interrupted, whatever portion of the media data that was received will be stored in local storage. Locally stored media data will then be playable offline. Therefore, data that is conventionally streamed via HLS may be effectively downloaded rather than immediately played.

A manifest associated with the streaming media data will be downloaded and a local copy of the manifest will be altered or modified to reflect the location of the locally stored media data. Then during a later playback of the media, the local manifest will indicate that a portion of the data exists in local memory. Other media data associated with the movie package may be retrieved from a remote source. The manifest will reflect the locations of the remotely accessible media data.

According to an embodiment, a user may be streaming video content and during playback of the streaming media, indicate that the media should be recorded or otherwise locally saved to local storage for later playback. Then the streamed media data stored in a buffer awaiting playback may be stored (aka spilled over) to the local memory. According to an embodiment, the media data may be stored in multiple files as needed. Then the stored media data, even if the portion of the movie that is saved is incomplete, may be treated like a stored movie package. The stored data may be updated or added to as necessary.

FIG. 1 is a simplified functional block diagram of an exemplary streaming system 100 according to an embodiment of the present disclosure. The system may include a media source 110 and one or more client devices 130, 132, 134 interconnected via one or more communication network(s) 140.

The media source 110 may include a source server 112 that performs processing operations on behalf of the stored media data. A storage system 114 stores the movie package master manifest 116 for the movie and the available media resources 118.1-118.n as part of the coded media data.

The architecture presented in FIG. 1 illustrates entities that are involved in storing and decoding a single coded media stream. This architecture may be expanded to accommodate multiple instances of media sources 110 and clients 130-134. Thus a single media source 110 may code and transmit multiple media streams to multiple clients 130-134 and clients may receive media streams from multiple sources. Additionally, a single media source 110 may store and transmit a common media stream in a variety of different bit rates or a variety of different frame sizes to accommodate capabilities of different types of clients. Each coded variant of a media stream may be considered to be a different media resource for purposes of the present discussion.

The client device(s) 130-134 represent media players that download movie packages from the media source 110, decode the coded media resources and render them for playback. A media source 110 may generate or store a movie package master manifest 116 to identify segments or tracks of the movie packages that are stored by a server 112 of the media source 110. The media source 110 may transmit the media resources 118.1-118.n to entities on the communication network 140 via a channel 142.

According to an embodiment, the client device's capabilities may determine which media resources of the movie package are retrieved for playback on that device. For example, a small screen device may not need to retrieve 1080p video for local playback but the 1080p resource would likely be retrieved when the movie package will be displayed on a television. Similarly, the device may retrieve only resources that the device can decode (e.g., video with certain encoded profiles/levels).

According to an embodiment, the movie package manifest 116 will also be transmitted to the client device 130 after the client device requests associated media data and stored on the client device as a local version of the manifest 120. According to an embodiment, the manifest may be retrieved before any of the media resources are retrieved or may be retrieved in the course of streaming the requested media resources. Then, for media resources 118 that are locally stored to the client device 130, the client device 130 may update the local version of the manifest 120 such that the manifest 120 points to the locally stored portions of media data as appropriate.

According to an embodiment, a client device 130 that stores a portion of a movie package may function as a media source for other client devices. For example, client device 132 may request movie data from client 130. Then client 130 may transfer the local manifest 120 to client 132 and client 132 may request copies of the data stored locally at client 130, as indicated by the manifest 120.

Figure 2:
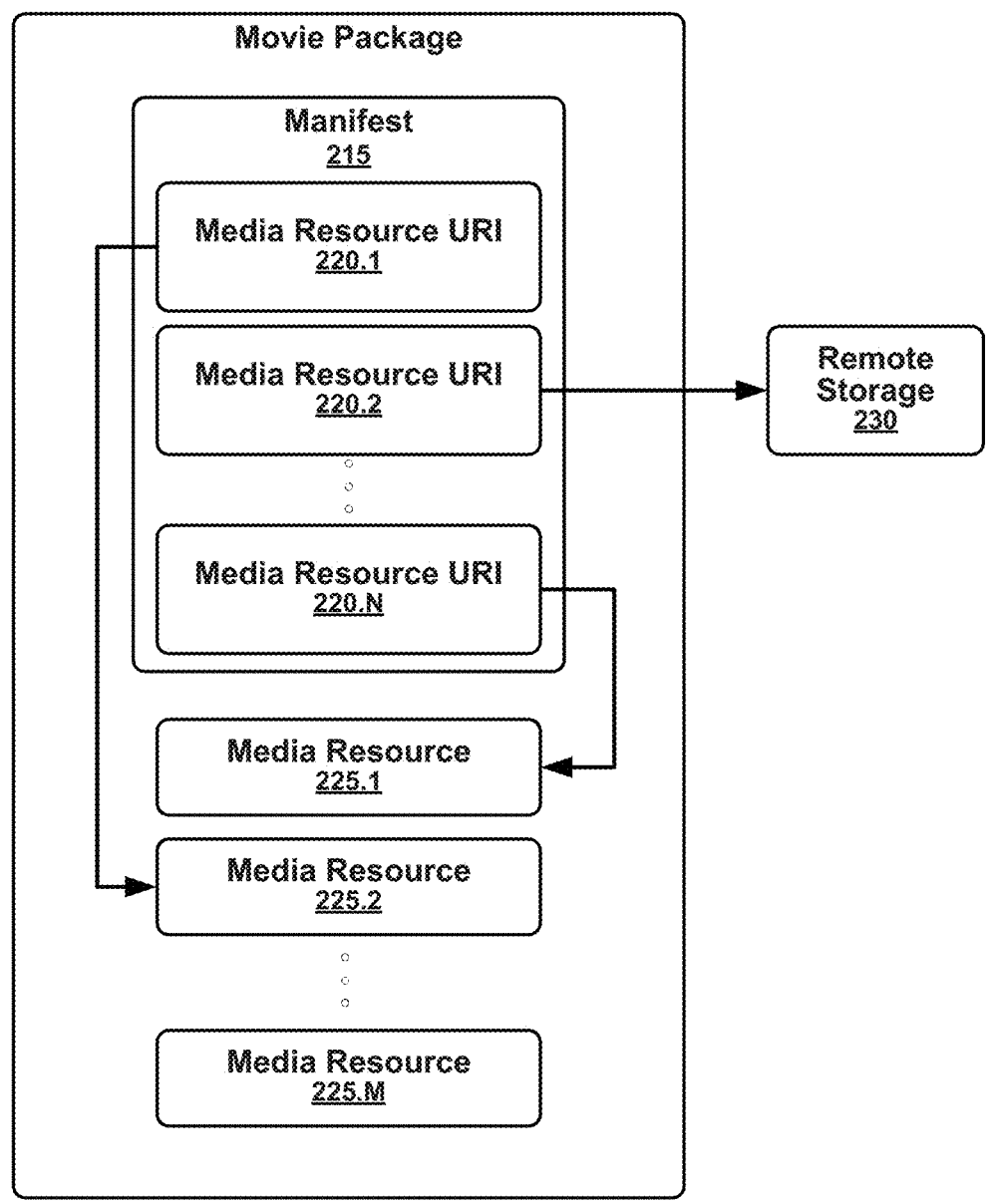
FIG. 2 illustrates an exemplary movie package stored on a client device according to an embodiment of the present disclosure.

FIG. 2 illustrates an exemplary movie package 200 stored on a client device according to an embodiment of the present disclosure. A movie package is a movie that appears as a single file system object and acts as a directory containing various media resources and related bookkeeping. A movie package holds a single presentation and may include multiple sets of media tracks or resources related to that presentation. The availability of media tracks determines the availability of the kinds of media associated with the movie presentation e.g. video, audio, captions, subtitles, commentaries, and so on. Media resources may be provided to cover a range of data rates, visual dimensions, codecs, or other aspects related to some measure of quality of the video data. A client device may stream one or more media resources associated with the movie package. Exemplary media resources may include one or more audio tracks, including multiple tracks in different languages; a subtitle file containing subtitle information for the movie, subtitles may be available in multiple different languages; closed caption information; and video encoded at different bit rates or resolutions, for example, different tracks may be provided for a low, medium, and high bitrate of video.

As shown in FIG. 2, the movie package may include a manifest 215 that may identify multiple potential media tracks, or movie resources, of the movie package 200. The manifest 215 may describe the available media resources and how the media resources are organized to build a presentation. The information provided in the manifest 215 includes the locations of various media resources associated with the movie package 200. For movie packages compatible with HLS, the semantics and terminology used in the manifest 215 will be consistent with HLS playlists.

The manifest 215 of the movie package 200 may include references to media resources at one or more uniform resource identifiers (URIs) including a local URI or a remote URI. A local URI references a location within the client device where the media resource is stored. A remote URI references the location of a remote version of the movie package to be retrieved and stored at the client device. The remote URI can reference any location that might store media data, for example a remote server, networked client, or other appropriate location. The manifest 215 may also reference multiple locations from which copies of the media files may be retrieved, for example, if there are several locations storing the same file.

As shown in FIG. 2, the manifest 215 includes references to multiple media resources via media resource URIs 220.1-220.N. The movie package 200 additionally includes multiple resources 225.1-225.M stored locally on the client device. The media resource URIs may point to these locally stored resources, as shown with URI 220.1 and URI 220.N. Additionally, media resource URIs may point to remotely stored media resources as shown with URI 220.2, which points to a remote storage device 230. According to an embodiment, a media resource may have several URIs such that the media resource may be stored locally, at one or more remote servers, and/or at another networked client device. The client device may decide to play or stream the media resource from any one of the indicated locations based on a policy decision.

Figure 3:
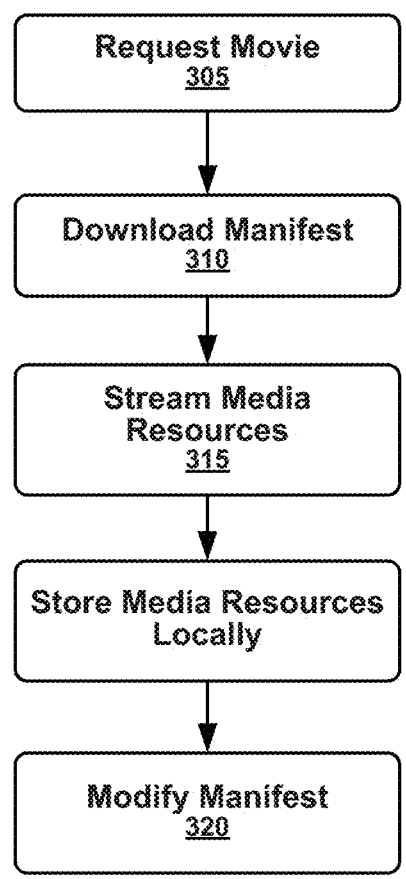
FIG. 3 illustrates an exemplary method for streaming movie packages according to an embodiment of the present disclosure.

According to an embodiment, users can stream video content to a personal computing device, such as a smart phone or tablet. FIG. 3 illustrates an exemplary method 300 for streaming movie packages according to an embodiment of the present disclosure. As shown in FIG. 3, the user may request a movie or video from a media source (block 305). Then, the user's network connected client device may download a copy of the master manifest associated with the requested movie from the media source (block 310). The copy of the master manifest may be stored at the client device. Then the media resources associated with the requested movie may be streamed to the client device (block 315). During streaming, the received video may be temporarily buffered in memory before playback and also more permanently stored in local storage (block 320). Once a media resource has been received and locally stored on the client device, the locally stored copy of the manifest may be updated to point to the locally stored media resource (block 325). According to an embodiment, the manifest may be downloaded before, during, or after the media resource has been received at the client device.

Figure 4:
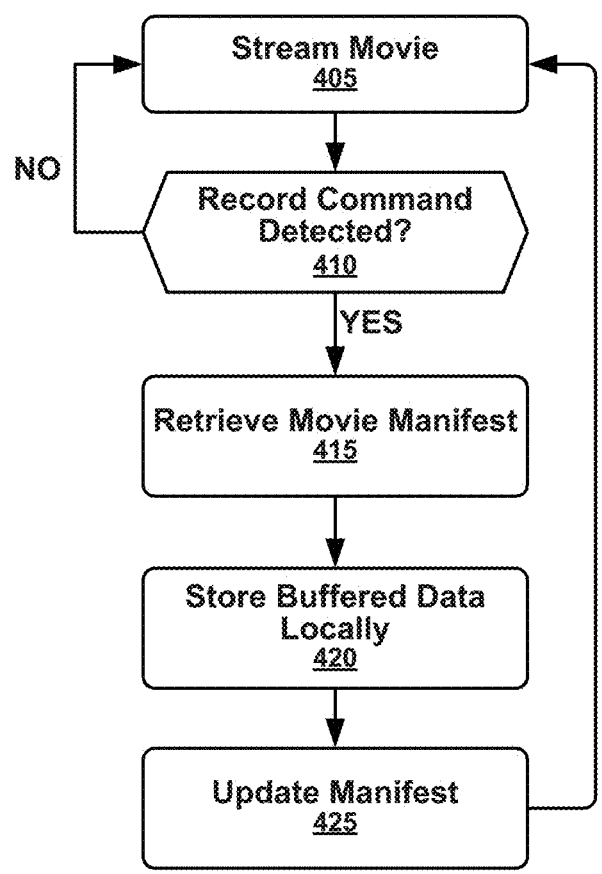
FIG. 4 illustrates an exemplary method for initiating local storage of a streaming movie package according to an embodiment of the present disclosure.

According to an embodiment, a user may begin streaming a movie or media content and then subsequently indicate that the movie should be locally saved. FIG. 4 illustrates an exemplary method 400 for initiating local storage of a streaming movie package according to an embodiment of the present disclosure. As shown in FIG. 4, a movie or other media may be streaming from a media source to a network connected client device (block 405). Then if a command to record the streaming data is detected (block 410), for example, if the user requests that the media be recorded, the manifest for the streaming data may be retrieved from the media source (block 415). The buffered media data from the data stream, and any subsequently received media data, may be stored in local storage (block 420). For media data that is locally stored, the local manifest may be updated to reflect the new location of the media data in the local storage (block 425).

If the streaming of media data has been in progress for an amount of time before the record command is received, and previously streamed media data has already been displayed and discarded, the locally stored media data may not represent a complete movie. Then the manifest for the stored media will include URIs to remote storage for the lost part of the media data. Thus, when playback of media data is requested, the local manifest may first be consulted to identify the location of each required media resource. Complete and locally stored media resources may be played before accessing the network to stream required media resources. According to an embodiment, after the streaming of the media data is complete, missing or lost media resources may be retrieved and the manifest subsequently updated.

If a portion of a media resource is available locally, but additional resources are available or are required to complete playback, the client device may begin playback of the locally stored media data while the additional data is retrieved from a remote source. Then, the additional data may be streamed to the local client device. For example, if a lower quality media resource is available locally, but a higher quality resource can be played at the client device and is available from a remote source, the playback of the movie may start with the low quality resources while the high quality resources are streamed. When the high quality resource is available for display, playback may be switched from the low quality to the high quality media resource.

According to an embodiment, the local manifest may maintain multiple references for each media resource including the original reference to the remote storage of the media reference as well as a reference to the locally stored media resource and any other known locations for the media resource. To determine whether the movie has been updated, the manifest stored at the remote source may be compared to the locally stored manifest to identify differences or updates. Or an updated manifest may be pushed to the client devices and modified at the client device to identify locally stored media resources.

According to an embodiment, multiple applications on a client device may access a movie package simultaneously. Such access may include streaming and storing one or more tracks for the movie package. In order to prevent the streams being downloaded and stored to a single location, a file where a streaming track is being stored may be locked until the streaming and storage of the track has been completed. When a file is locked, no other applications can write to the file. However, other applications may still read the media data stored in the file. According to an embodiment, the manifest may be locked to prevent writing of different streams to a single location, e.g. the storage location or stored file for the streaming media data within a storage device. When the manifest is locked, no other streams can be written to the movie package associated with the manifest until the manifest is unlocked. A manifest may be locked for only a track (or stream) of the movie package, in which case only write access for that track (or stream) is restricted, or for the entire movie package, restricting all write access for the movie package.

Figure 5:
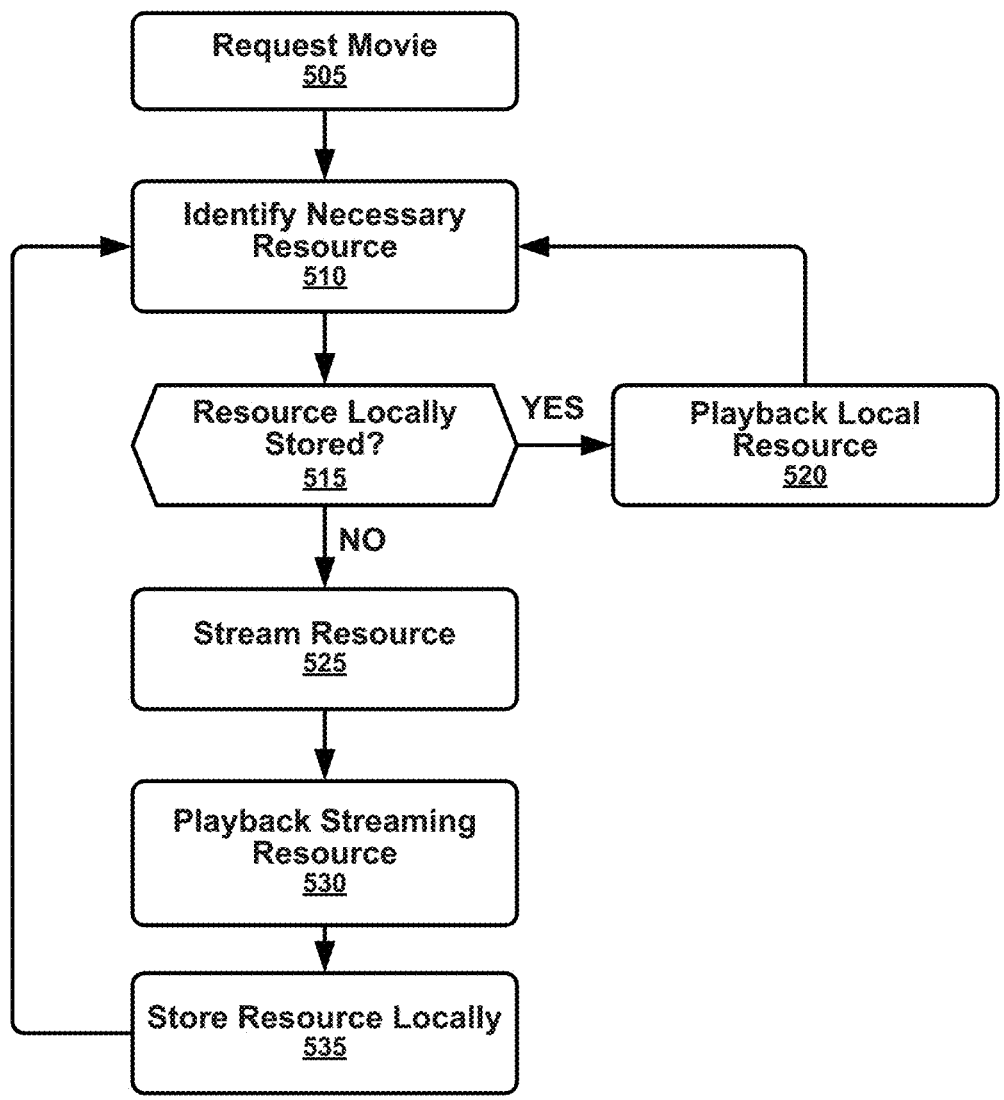
FIG. 5 illustrates an exemplary method for playing a movie that is at least partially locally stored according to an embodiment of the present disclosure.

FIG. 5 illustrates an exemplary method 500 for playing a movie that is at least partially locally stored according to an embodiment of the present disclosure. As shown in FIG. 5, the user may request a movie or video for playback on a client device (block 505). Then, in order to playback the requested movie, the client device will identify a resource necessary to play the requested movie (block 510). As described herein, resources may be identified in a manifest that identifies the available media resources and tracks that are associated with the movie and that may be accessed for playback. For each identified resource, it may first be determined whether the resource is locally stored (block 515). As described in further detail herein, the manifest may include one or more URIs for the resource. If a local URI exists in the manifest, then the resource is locally stored. If only a remote URI is available for the required resource then the resource is not locally stored. If an appropriate copy of the resource is available from local storage, the locally stored resource will be played (block 520). However, if the required resource is not locally stored, the resource may be streamed from a remote source, such as a media source, server, or other connected client device (block 525). Then while the required resource is streaming from the remote source to the client device, the media resource will be played at the client device (block 530) and may also be locally stored (block 535) as described herein.

Figure 6:
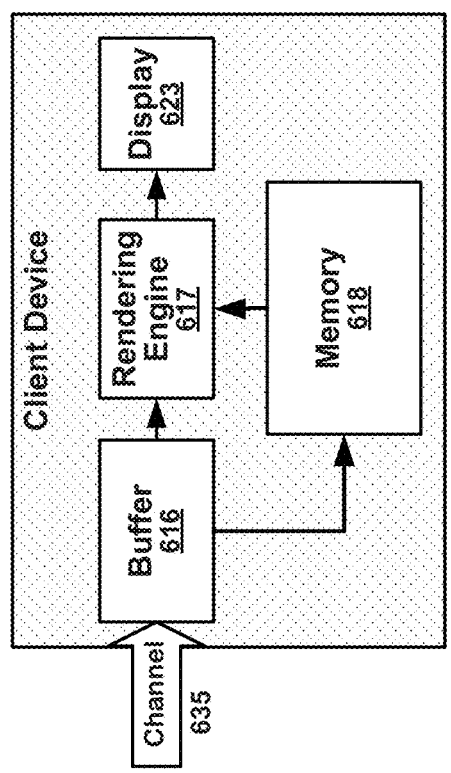
FIG. 6 is a simplified block diagram that illustrates an exemplary client device for use with embodiments of the present disclosure.

FIG. 6 is a simplified block diagram that illustrates an exemplary client device 600 for use with embodiments of the present disclosure. As shown in FIG. 6, the client device 600 includes a buffer 616 that receives streaming media from a channel 635.

The media received at the client device on the channel may be encoded using known encoding techniques. The client device will typically receive a coded representation of source video and reverse the coding operations that were performed by an encoding system to retrieve a reconstructed version of the source video. Conventionally, source video will be encoded into a coded representation that has a smaller bit rate than does the source video and thereby achieve data compression. One common technique for data compression uses predictive coding techniques (e.g., temporal/motion predictive encoding). The coding and decoding operations may be performed according to a predetermined multi-stage protocol, such as HEVC, H.263, H.264, or MPEG-2. Coded video data, therefore, may conform to a syntax specified by the protocol being used.

To recover the video data, the bitstream may be decompressed by a decoder (not shown) at the client device 600, yielding a received decoded video sequence. The decoded data will then be buffered for display. The recovered and buffered video data will be prepared by a rendering engine 617 for display on a display component 623 of the client device 600. The recovered video data may also be stored in local memory 618 as described herein. The rendering engine 617 may also receive video data from the local memory 618 if the video data was previously stored as described herein. According to an embodiment, a controller or processor (not shown) may manage the transfer of media data between components and modification of the manifest. Additionally, the controller or processor may make policy decisions regarding the retrieval and playback of media resources.

Figure 7:
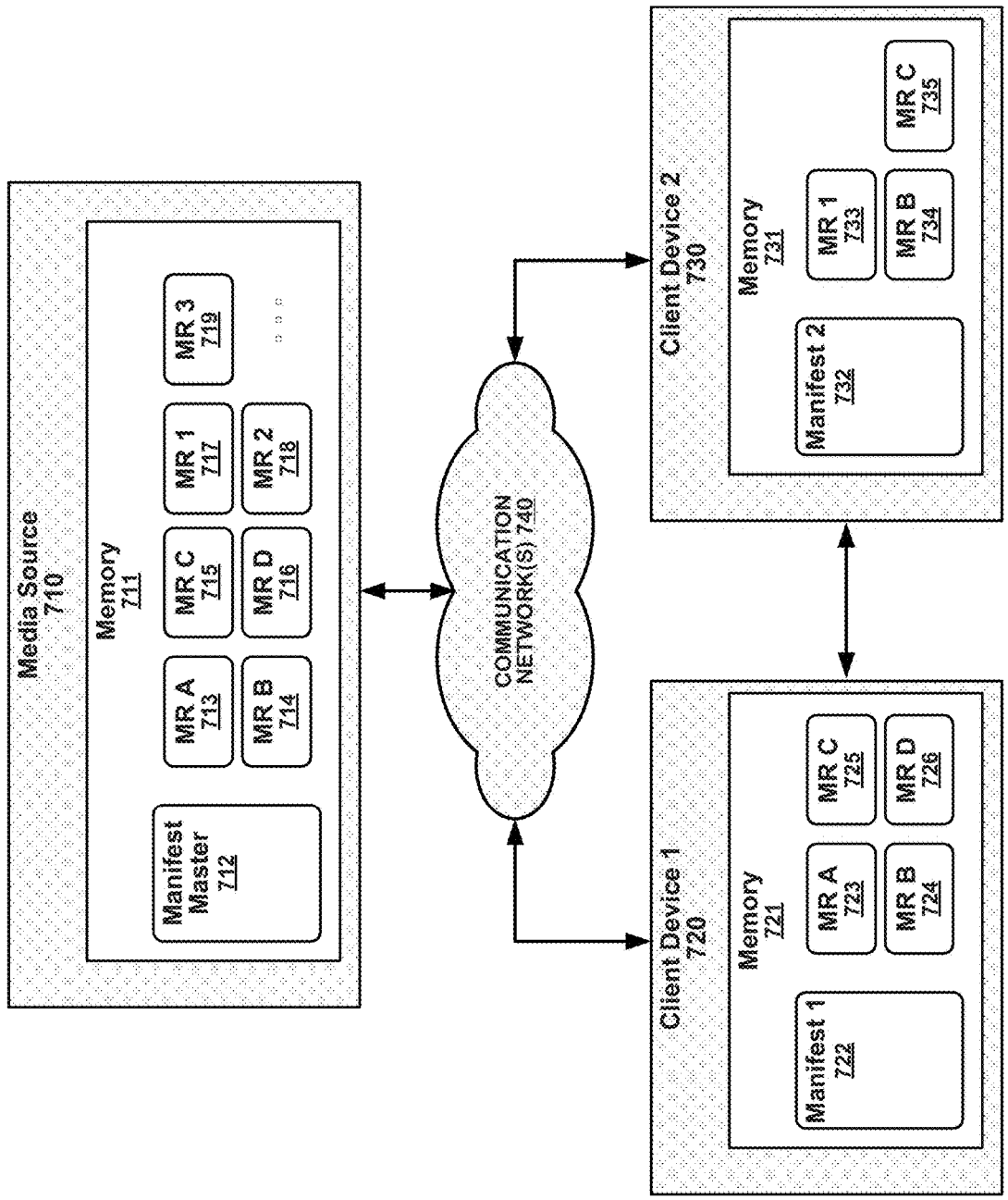
FIG. 7 is a simplified functional block diagram illustrating an exemplary video communication system according to an embodiment of the present disclosure.

FIG. 7 is a simplified functional block diagram illustrating an exemplary video communication system 700 according to an embodiment of the present disclosure. As shown in FIG. 7, client devices 720 and 730 may each be connected to a media source 710 via a communication network 740 such as the Internet. As previously noted, the media source 710 may include a storage system or memory 711 that stores a movie package master manifest 712 for a movie and the associated available media resources 713-719 as coded media data. The movie package master manifest 712 identifies tracks or media resources of the movie packages that are stored at the media source 710. The media source 710 may transmit the media resources 713-719 and master manifest 712 to the client devices 720, 730 via the communication network 740.

According to an embodiment, for media resources 723-726 that are downloaded and locally stored to the client device 720, the client device 720 may update a local version of the manifest 722 such that the manifest 722 points to the locally stored portions of media data as appropriate. The local version of the manifest will still point to the media source 710 for those media resources 717-719 not downloaded to the client device 720.

If client device 730 subsequently requests the same movie or video, then client device may request that movie from either the media source 710 or from client device 720. If the client device 730 requests the movie from client device 720, client device 720 may receive a copy of manifest 722 locally stored at client device 720. Then, after saving a copy of the manifest locally as manifest 732, client device 730 can retrieve media resources according to the URIs in the manifest 732. For example, if client device 730 needs media resource MR 1 and MR B and MR C for playback of the movie on the device, then client device 730 may stream the copy of MR 1 from the media source 710. However, because copies of media resources MR B and MR C are available from client device 720, client device 730 may retrieve media resources 724 and 725 from client 720 via the communication network 740 or some other connection. Then the local copy of the manifest, 732, will be updated to identify the locations of the locally stored media resources 733-735 at client device 730.

For example, if the client device 730 is a handheld tablet or smart phone and the second client device 720 will display the video content on a larger screen, such as a television, the audio related resources may be retrieved by the client device 730 from the client device 720 but where client device 720 stores a lower resolution of the video, 1080p or better HD video may be streamed by the second client device 730 from the media source 710.

The client devices illustrated in FIG. 7 may include devices connected in a local group, for example within a classroom or other small group where one device is a mediator for the remaining connected devices in the group. The mediator of such a group could then edit the manifest that will be exchanged with the group to exclude URIs to media resources or tracks that are undesirable for the group. For example, the mediator might exclude content that would be inappropriate for minors from the shared manifest, or for other policy or security reasons may limit access to certain tracks. According to an embodiment, different manifests may be made available to different clients as needed according to user defined policy decisions.

Although the complete movie might contain video at several different resolutions, audio in multiple languages, subtitles in still more languages, and closed caption information, only the content suitable for the device need be streamed to the client device. The other content types may be made available but won't necessarily need to be downloaded when the video is initially requested.

The configurations illustrated in FIGS. 1 and 6 present generalized architectures of systems in which a common network is illustrated as carrying communication from the media source to the client device. However, the principles of the present invention find application with a variety of different implementations. In one implementation, the media source and client devices may communicate with each other via a common network such as the Internet. In another implementation, the media source may be connected to the client device via separate networks (not shown). For example, via a gateway device or router (not shown) connected to the client by a wired or wireless local area network. The gateway device may then be connected to the media source via a wide area network. Thus, the distribution, topology and architecture of the communication network(s) is immaterial to the operation of the present invention unless discussed otherwise herein.

According to an embodiment, stored movie packages can grow to hold new media by adding more tracks and updating the manifest to reference the new media streams. When the movie is updated, or new content is available, users may be notified about the updated package and have an option to download an updated version.

As discussed above, FIGS. 1 and 6 illustrate functional block diagrams of exemplary systems according to an embodiment of the present disclosure. In implementation, the systems may be embodied as hardware, in which case, the illustrated blocks may correspond to circuit sub-systems within the systems. Alternatively, the components of the systems may be embodied as software, in which case, the blocks illustrated may correspond to program modules within software programs. In yet another embodiment, the systems may be hybrid systems involving both hardware circuit systems and software programs.

Moreover, not all of the functional blocks described herein need be provided or need be provided as separate units. For example, although FIG. 6 illustrates the components of an exemplary client, such as the buffer and rendering engine as separate units, in one or more embodiments, some or all of the components may be integrated. Such implementation details are immaterial to the operation of the present invention unless otherwise noted above. Additionally, although FIGS. 3, 4, and 5 illustrate exemplary methods, the order of operations may be altered or some operations skipped entirely.

Some embodiments may be implemented, using a non-transitory computer-readable storage medium or article which may store an instruction or a set of instructions that, if executed by a processor, may cause the processor to perform a method in accordance with the disclosed embodiments. The exemplary methods and computer program instructions may be embodied on a non-transitory machine-readable storage medium. In addition, a server or database server may include machine-readable media configured to store machine executable program instructions. The features of the embodiments of the present invention may be implemented in hardware, software, firmware, or a combination thereof and utilized in systems, subsystems, components or subcomponents thereof. The machine-readable storage media may include any medium that can store information. Examples of a machine-readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

While the invention has been described in detail above with reference to some embodiments, variations within the scope and spirit of the invention will be apparent to those of ordinary skill in the art. Thus, the invention should be considered as limited only by the scope of the appended claims.

We claim:

1. A method for storing a movie package at a client device, the method comprising:
   receiving, from a media source, streamed media data associated with the movie package at the client device via a network connection;
   receiving a manifest for the movie package at the client device, the manifest listing location(s) at the media source from which the streamed media data can be retrieved;
   storing the received media data in a storage device of the client device;
   modifying the manifest to reflect storage locations in the storage device for the stored media data,
   storing the revised manifest in the storage device; and
   locking the stored manifest to prevent write access to the storage locations in the stored manifest.

2. The method of claim 1, wherein said storing begins upon receiving a record command at the client device.

3. The method of claim 1, wherein the media data is streamed to the client device using HTTP Live Streaming (HLS).

4. The method of claim 1, wherein the manifest contains a plurality of uniform resource identifiers (URIs), each URI identifying a location of media data associated with the movie package.

5. The method of claim 4, wherein said modifying comprises adding a URI referencing the storage location in the storage device for the media data.

6. The method of claim 1, further comprising playing the streamed media data at the client device.

7. The method of claim 6, further comprising upon receiving a request to play the movie package, if media data associated with the movie package is stored at the storage device, playing the locally stored media data, otherwise receiving and playing media data associated with the movie package from a remote source.

8. The method of claim 1, further comprising subsequent to completing streaming the media data, receiving additional streamed media data at the client device and adding the additional streamed media data to the movie package.

9. The method of claim 1, further comprising creating a copy of the modified manifest and transmitting the copy to a second client device, wherein the second client device streams media data from either the client device based on a reference in the modified manifest to the storage location of the storage device or to a remote source based on a reference in the modified manifest to a remote storage location.

10. A non-transitory computer readable medium storing program instructions that, when executed by a processing device, cause the device to:
    receive, from a media source, streaming media data associated with a movie package at the device via a network connection;
    buffer the received media data;
    receive a manifest for the movie package at the device, the manifest listing location(s) at the media source from which the streamed media data can be retrieved;
    store the buffered media data in a storage device of the device;
    modify the manifest to reflect storage locations in the storage device for the stored media data;
    store the modified manifest on the device; and
    lock the stored manifest to prevent write access to the storage locations in the manifest.

11. The non-transitory computer readable medium of claim 10, wherein said program instructions further cause the device to store the buffered media data upon receiving a record command.

12. The non-transitory computer readable medium of claim 10, wherein the media data is streamed to the device using HTTP Live Streaming (HLS).

13. The non-transitory computer readable medium of claim 10, wherein the manifest contains a plurality of uniform resource identifiers (URIs), each URI identifying a location of media data associated with the movie package.

14. The non-transitory computer readable medium of claim 13, wherein said program instructions further cause the device to modify the manifest by adding a URI referencing the storage location in the storage device for the media data.

15. The non-transitory computer readable medium of claim 10, wherein said program instructions further cause the device to play the streamed media data at the device.

16. The non-transitory computer readable medium of claim 15, wherein upon receiving a request to play the movie package, said program instructions further cause the device to play the locally stored media data if media data associated with the movie package is stored at the storage device, otherwise media data associated with the movie package is received and played from a remote source.

17. The non-transitory computer readable medium of claim 10, said program instructions further cause the device to receive additional streamed media data to the device and add the additional streamed media data to the movie package subsequent to completing streaming the media data.

18. The non-transitory computer readable medium of claim 10, further comprising creating a copy of the modified manifest and transmitting the copy to a second device, wherein the second device streams media data from either the storage device based on a reference in the modified manifest to a storage location of the storage device or a remote source based on a reference in the modified manifest to a remote storage location.

19. A system, comprising:
a buffer to receive, from a media source, streaming media data associated with a movie package;
a storage device to store buffered media data; and
a processor configured to:
receive a manifest for the movie package, the manifest listing location(s) at the media source from which the streamed media data can be retrieved;
modify the manifest to reflect storage locations in the storage device for the stored media data;
store the modified manifest on the device; and
lock the stored manifest to prevent write access to the storage locations in the manifest.

20. The system of claim 19, wherein said media data is stored in the storage device upon receiving a record command at the system.

21. The system of claim 19, wherein the media data is streamed to the system using HTTP Live Streaming (HLS).

22. The system of claim 19, wherein the manifest contains a plurality of uniform resource identifiers (URIs), each URI identifying a location of media data associated with the movie package.

23. The system of claim 22, wherein the processor is configured to modify the manifest by adding a URI referencing the storage location in the storage device for the media data.

24. The system of claim 19, further comprising a display and a rendering engine to play the streamed media data on the display.

25. The system of claim 24, further comprising upon receiving a request to play the movie package, if media data associated with the movie package is stored at the storage device, the rendering engine plays the locally stored media data, otherwise media data associated with the movie package is received and played from a remote source.

26. The system of claim 19, wherein subsequent to completing streaming of the media data, additional streamed media data is received from a remote source and the processor is further configured to add the streamed media data to the movie package.

27. The system of claim 19, wherein the processor is further configured to create a copy of the modified manifest and to transmit the copy to a second client device, wherein the second client device streams media data from either the storage device based on a reference in the modified manifest to a storage location of the storage device or a remote source based on a reference in the modified manifest to a remote storage location.

* * * * *